(12) United States Patent
Ische

(10) Patent No.: US 7,922,238 B2
(45) Date of Patent: Apr. 12, 2011

(54) QUICK CHANGING REAR MODULE BODY VEHICLE

(76) Inventor: Timothy Burtel Ische, Eau Claire, WI (US)

( * ) Notice: Subject to any disclaimer, the term of this patent is extended or adjusted under 35 U.S.C. 154(b) by 127 days.

(21) Appl. No.: 12/313,035

(22) Filed: Nov. 17, 2008

(65) Prior Publication Data
US 2010/0123334 A1 May 20, 2010

(51) Int. Cl.
*B62D 27/06* (2006.01)
(52) U.S. Cl. .................................. 296/193.04; 296/35.3
(58) Field of Classification Search .................. 296/156, 296/26.01, 26.02, 193.03, 193.04, 35.1, 35.3
See application file for complete search history.

(56) References Cited

U.S. PATENT DOCUMENTS

| | | | | |
|---|---|---|---|---|
| 1,303,854 A * | 5/1919 | Clark | ............................. | 414/498 |
| 2,555,336 A * | 6/1951 | Hagely | .......................... | 254/424 |
| 2,665,938 A * | 1/1954 | McCrossen | .................. | 296/35.3 |
| 2,834,599 A * | 5/1958 | Sarchet | ............................ | 280/30 |
| 3,460,697 A * | 8/1969 | Cowlishaw et al. | ........... | 414/498 |
| 4,225,153 A * | 9/1980 | Bez et al. | ....................... | 280/788 |
| 4,489,977 A * | 12/1984 | Earing, Jr. | ..................... | 296/35.3 |
| 4,750,855 A * | 6/1988 | Anderson | ....................... | 414/498 |
| 4,842,326 A * | 6/1989 | DiVito | ...................... | 296/193.04 |
| 4,969,690 A * | 11/1990 | Smith | ............................ | 298/17 R |
| 5,301,997 A * | 4/1994 | Cudden | ........................ | 296/182.1 |
| 5,833,302 A * | 11/1998 | Kerr | ................................ | 296/167 |
| 6,802,441 B1 * | 10/2004 | DuRant et al. | ................. | 224/513 |
| 7,621,578 B2 * | 11/2009 | Anderson | ...................... | 296/35.3 |
| 7,722,110 B2 * | 5/2010 | McCarthy et al. | ............ | 296/156 |
| 2005/0067857 A1 * | 3/2005 | Call | ............................... | 296/156 |

* cited by examiner

*Primary Examiner* — Jason S Morrow
(74) *Attorney, Agent, or Firm* — Robert A. Elwell

(57) ABSTRACT

A vehicle having a driving cab and specialized frame extending rearward from the driving cab and a rear module body which can be easily exchanged on the specialized frame. The specialized frame has two rails, each with an incline, and the rear module body has two open bottom frame channels, which conform to the rails and the inclines. When lowered onto the specialized frame, interaction between the specialized frame and frame channels creates a forward push resulting in a tight fit of the rear module body to the rear of the driving cab. Sliding lock jack assemblies fasten the rear module body to the specialized frame and deploy to unfasten and then lift the rear module body free of the specialized frame. The slide lock jack assemblies conceal in compartments while fastening and rotate 90 degrees to lift.

17 Claims, 11 Drawing Sheets

US 7,922,238 B2

QUICK CHANGING REAR MODULE BODY VEHICLE

RELATED APPLICATIONS

Not Applicable

STATEMENT REGARDING FEDERALLY SPONSORED RESEARCH OR DEVELOPMENT

Not Applicable

NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to vehicles having rear module bodies; and in particular, the present invention relates to vehicles with driving cabs and frames, the vehicles having rear module bodies which may be quickly changed.

2. Description of Related Art

Not Applicable

SUMMARY

The present invention includes a base vehicle with a driving cab and a specialized frame extending rearward from behind the driving cab. The specialized frame has two rails, each with a top and sides and each rail has an inclined or slope segment. A rear module body for the base vehicle has two frame channels, each U-shaped and oriented with an open bottom and each of which contours to the top and sides of the rails of the frame. When the rear module body is lowered onto the base vehicle, the rails of the specialized frame and the frame channels of the rear module body interact to create a push forward and to slide the rear body forward and be joined into a tight fit with the driving cab of the base vehicle.

Four sliding lock jack assemblies, carried in side compartments of the rear module body, have locking tubes which extend through mounting holes or apertures in the frame channels and rails to fasten the rear module body to the vehicle in a fastened or locked, first position or condition, and disengage from the apertures to release the rear module body from the vehicle in a deployed or unlocked, second position or condition. The sliding lock jack assemblies have jacks attached to the locking tubes that may be used to lift the rear module body from the vehicle when deployed. The sliding lock jack assemblies may also carry a body panel to conceal the sliding lock jack assemblies in the side compartments when stowed and fastened in the first condition. The sliding lock jack assemblies may also be rotated 90 degrees about the locking tubes, with the attached jacks horizontally oriented in a stowed position for housing in the side compartments, and with the jacks oriented vertically in a deployed or unlocked position for lifting the rear module body from the base vehicle. The sliding lock jack assemblies may include a pump system to operate the jacks in lifting the rear module body which is powered with electricity supplied by the vehicle.

DETAILED DESCRIPTION

Figure 1:
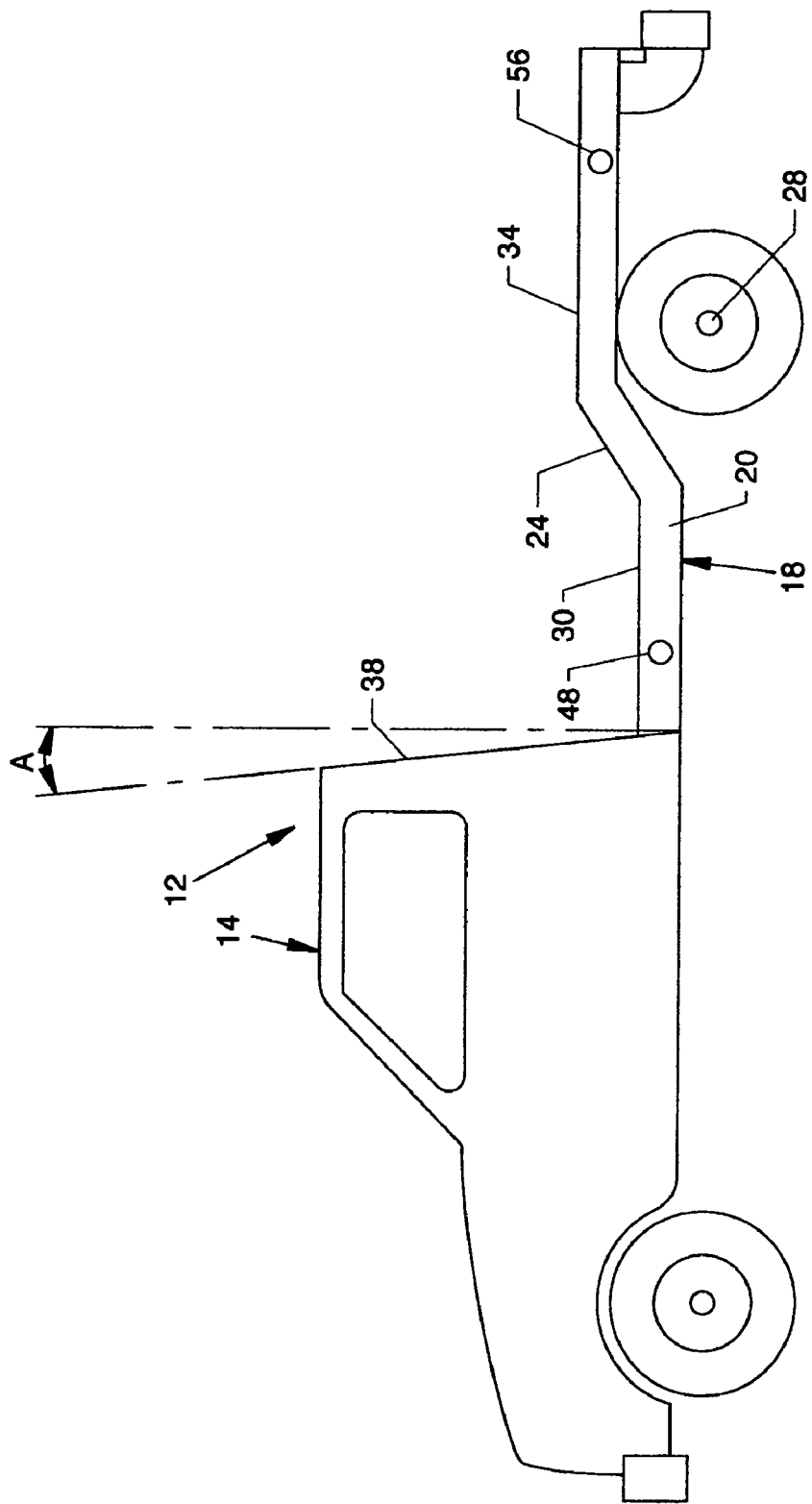
FIG. 1 schematically shows a side view of a base vehicle showing driving cab and showing exposed frame system.
Figure 2:
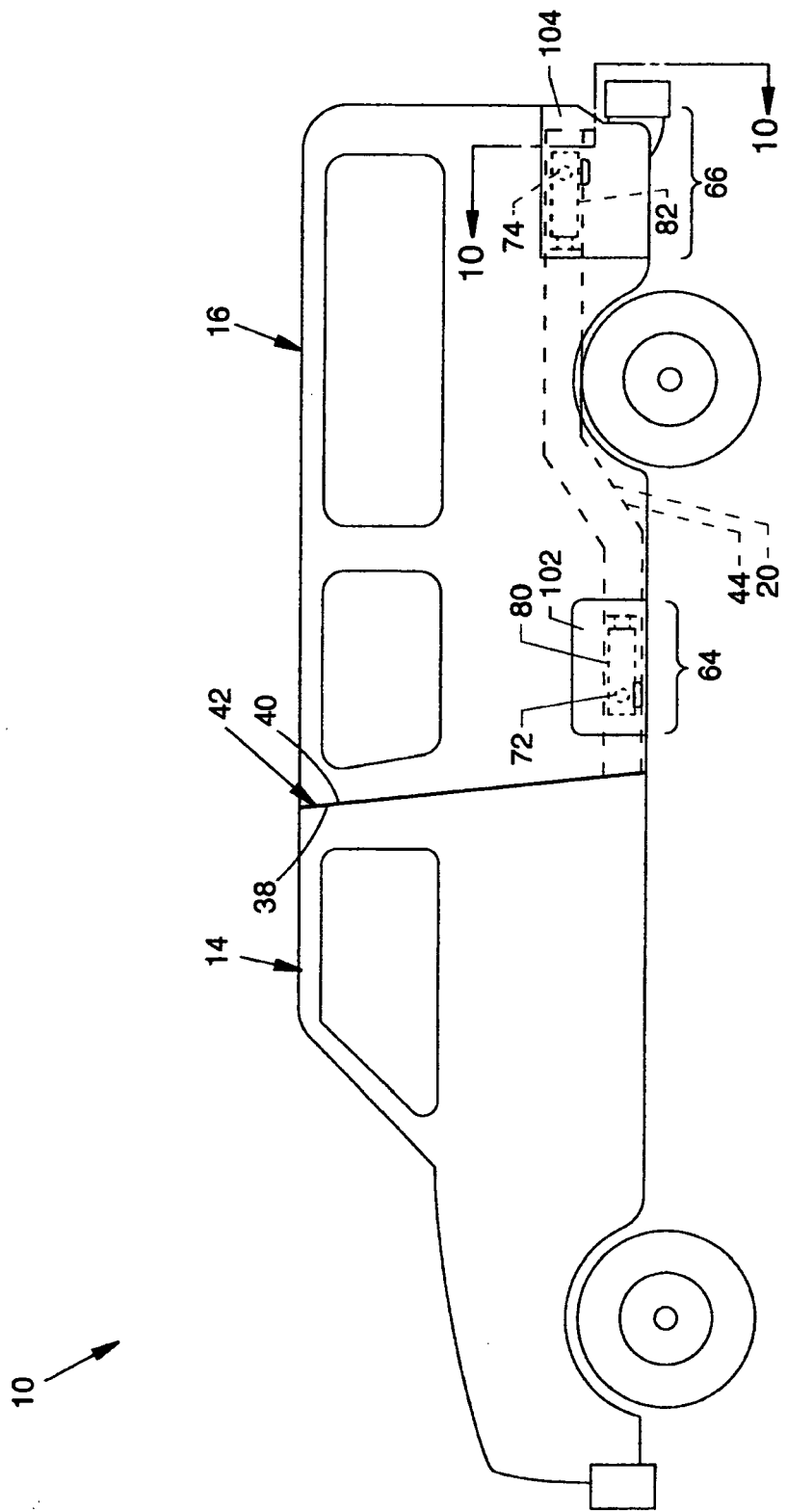
FIG. 2 schematically shows a side view of the base vehicle of FIG. 1 with the driving cab with rear module body attached and locking jacks in locked and stowed position.
Figure 3:
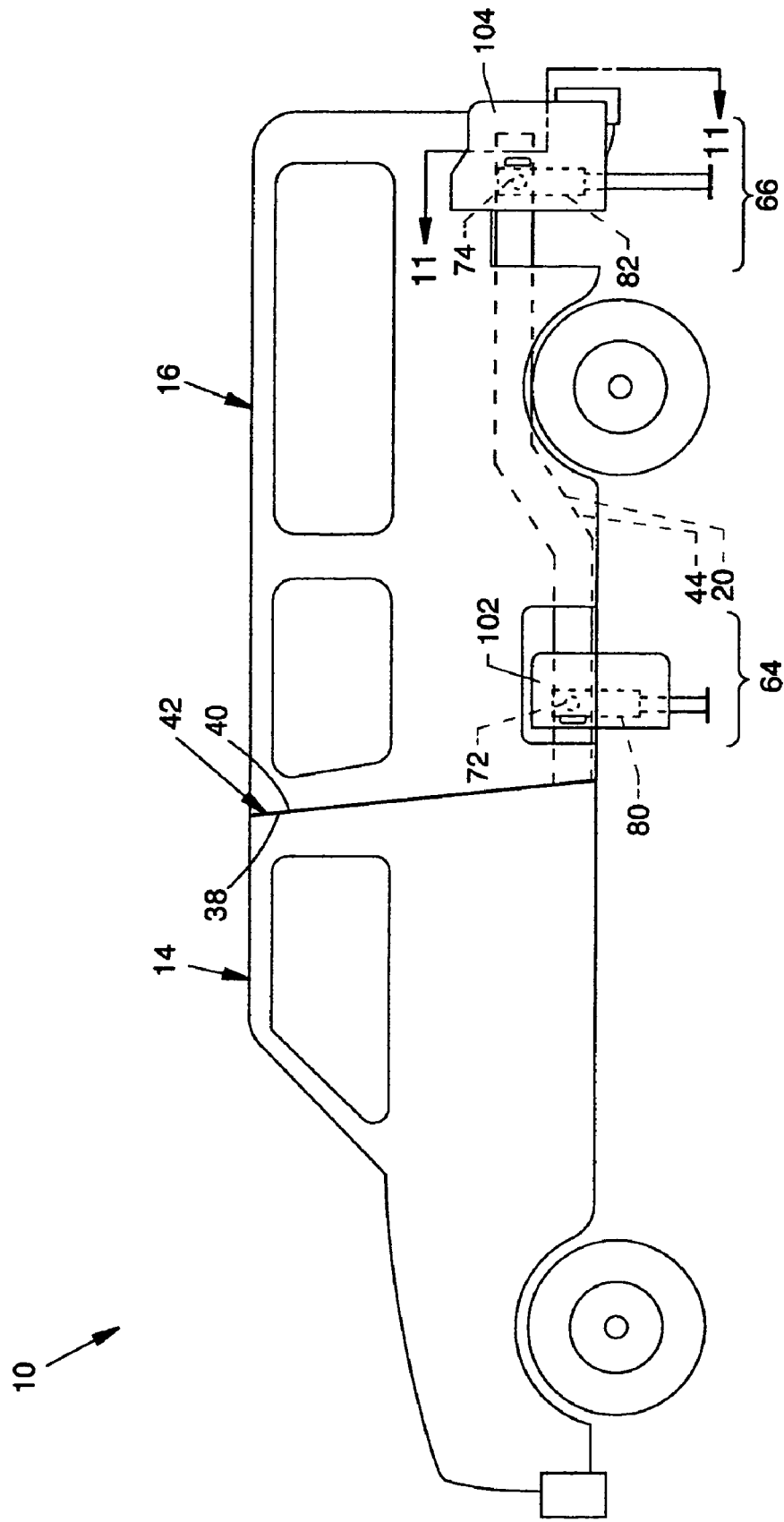
FIG. 3 schematically shows a side view of the base vehicle of FIG. 1 showing driving cab and rear module body readied for detachment of the rear module body by vertical lifting, with the locking jacks in vertical deployed position.
Figure 9:
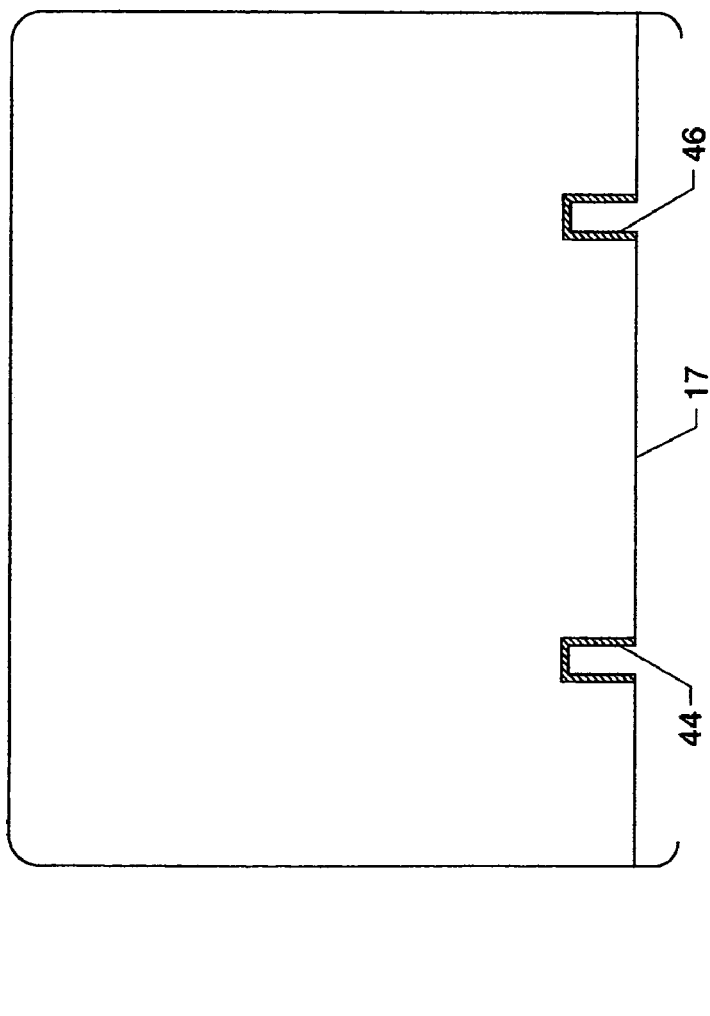
FIG. 9 schematically shows a partial cross section at 9-9 of FIG. 4 as a back view of rear module body and showing U-shaped frame channels.

In a first embodiment, my invention is a quick changing rear module body vehicle 10, schematically shown in FIGS. 2 and 3. The quick changing rear module body vehicle 10 has two primary components, a base vehicle 12 with a driving cab 14 and a specialized frame 18, schematically shown in FIG. 1, and a rear module body 16, schematically shown in FIGS. 4 and 5, which can be quickly changed upon the base vehicle 12. The details of my invention starting at FIG. 1 shows the base vehicle 12 with the driving cab 14 and with a specialized frame 18 consisting of two rectangular tubular frame rails extending rearward from the driving cab 14. These two rectangular tubular frame rails would each have an upward slope segment starting in front of the rear axle 28 and leveling above the rear axle 28 to the rear of the frame 18. Left frame rail 20 is shown in FIG. 1 and slope segment 24 of left frame rail 20 is shown between a mid-segment 30 of left rectangular tubular frame rail 20 which extends rearward from the driving cab 14 to the left slope segment 24, which in turn, is connected to a rear elevated segment 34. The rear 38 of the driving cab 14 would be open to allow the rear module bodies 16, which are also open to the front 40, allowing both body sections 14 and 16 to be joined at a junction 42 as schematically depicted in FIG. 2. All rear module bodies 16 will have two frame channels 44 and 46 located on the bottom 17 of the rear modular body 16. These frame channels 44 and 46 will be U-shaped as shown in FIG. 9, contouring precisely around the two rectangular tubular frame rails leaving only the bottom side open. This open frame channel design will allow for the lifting of the rear module bodies 16 off of the left rectangular tubular frame rail 20 and the right rectangular tubular frame rail of the specialized frame 18 extending rearward from the driving cab 14 of the base vehicle 12. Each rectangular tubular frame rail 20 rearward of the driving cab 14 will have four mounting holes or apertures, two on the inside and two on the outside, corresponding with each other. In other words, mid-segment 30 of the left frame rail 20 has an outside aperture 48 and an inside aperture which are co-aligned and mid-segment of the right frame rail has an outside aperture and an inside aperture which are co-aligned; elevated rear segment 34 of left frame rail 20 has an outside aperture 56 and an inside aperture which are co-aligned and elevated rear segment of right frame rail has outside aperture and inside aperture which are co-aligned. These left outside mounting holes or apertures 48 and 56 would be located on the specialized frame 18 behind the driving cab 14 on left mid-segment 30 and behind the rear axle 28 on left elevated rear segment 34.

Figure 4:
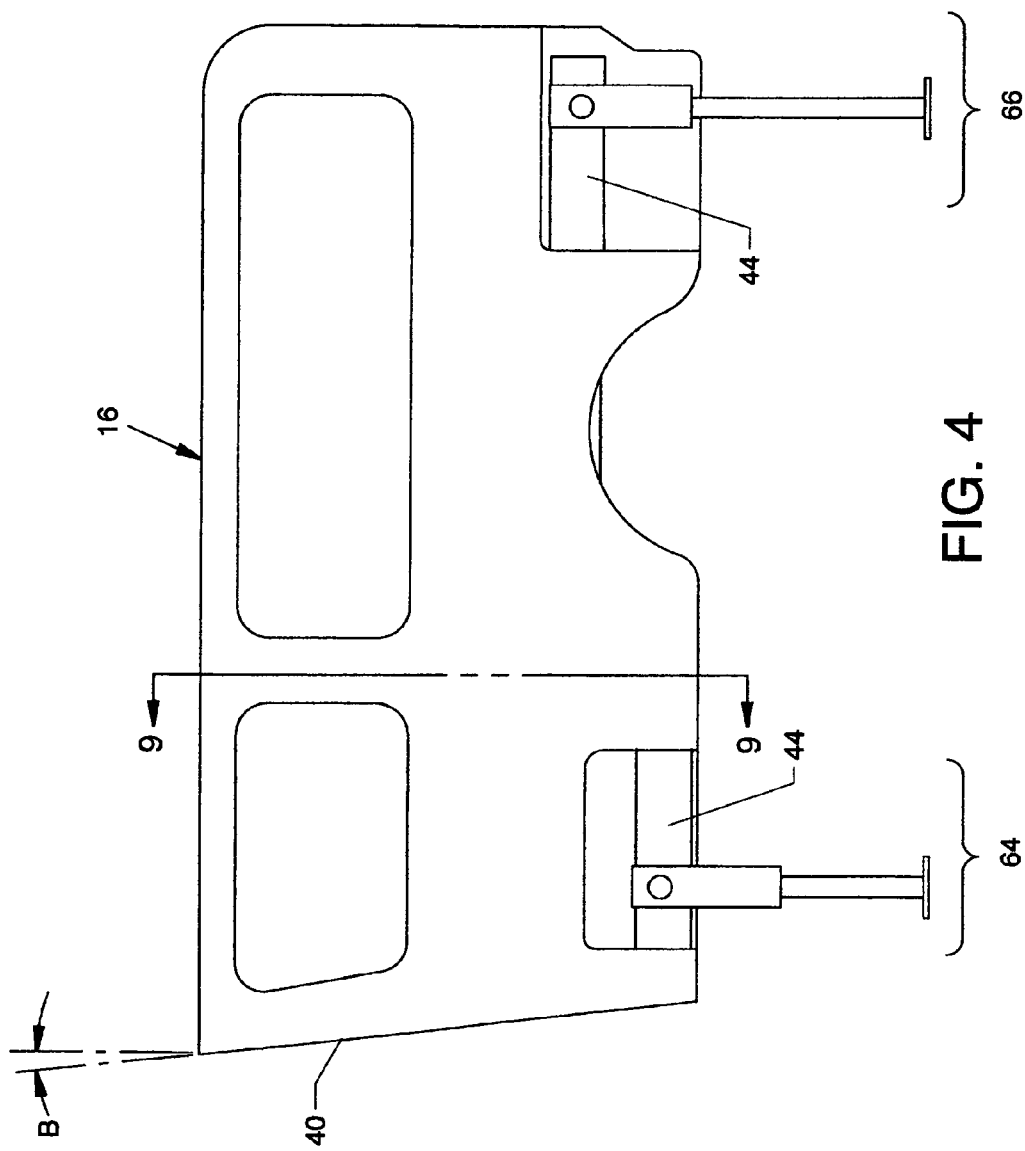
FIG. 4 schematically shows a side view of a free standing module body previously shown in FIGS. 2 and 3 being supported by the sliding lock jacks.
Figure 5:
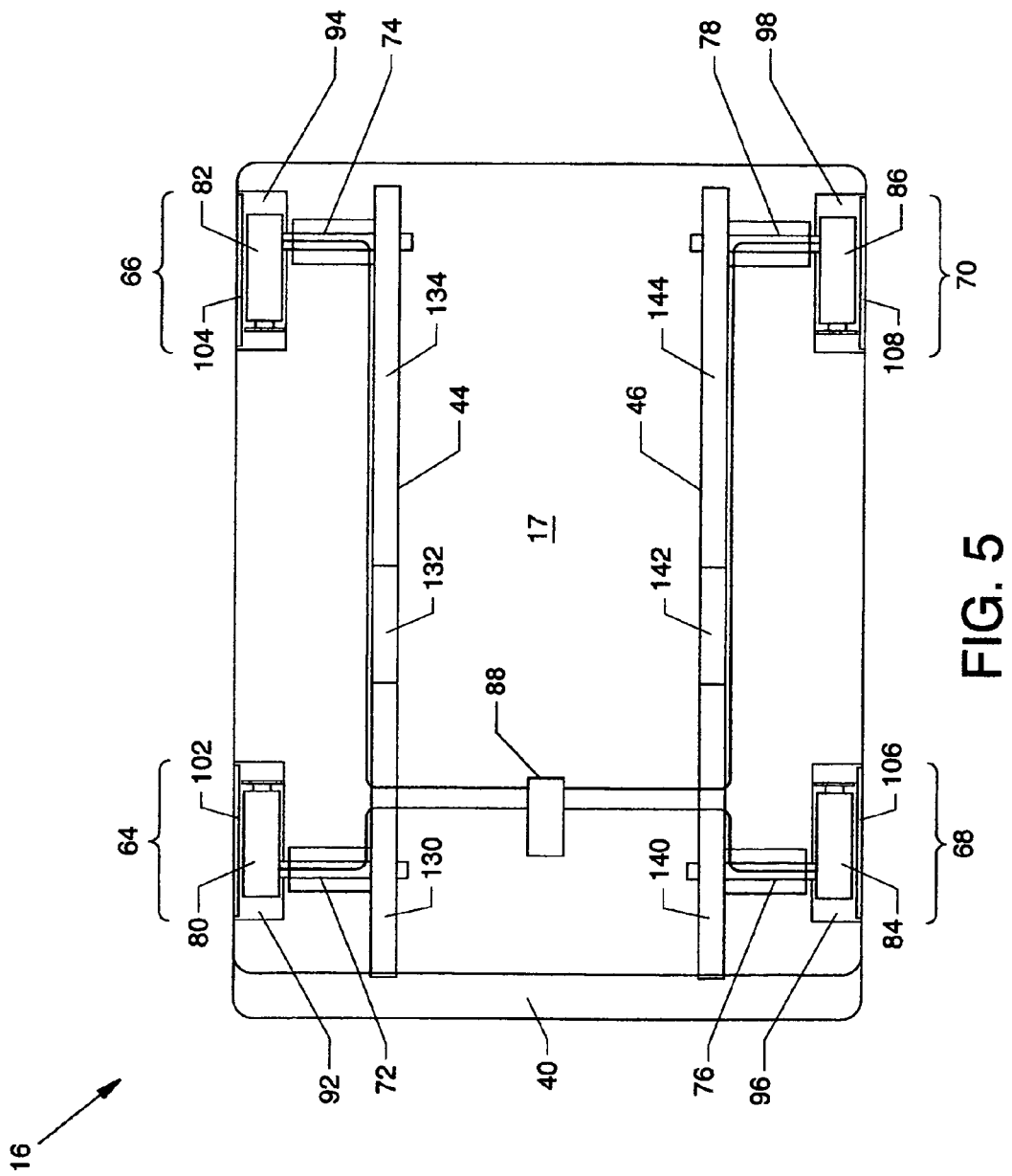
FIG. 5 schematically shows a bottom view of a rear module body with emphasis upon the location of sliding lock jacks, pump system and frame channels.
Figure 6:
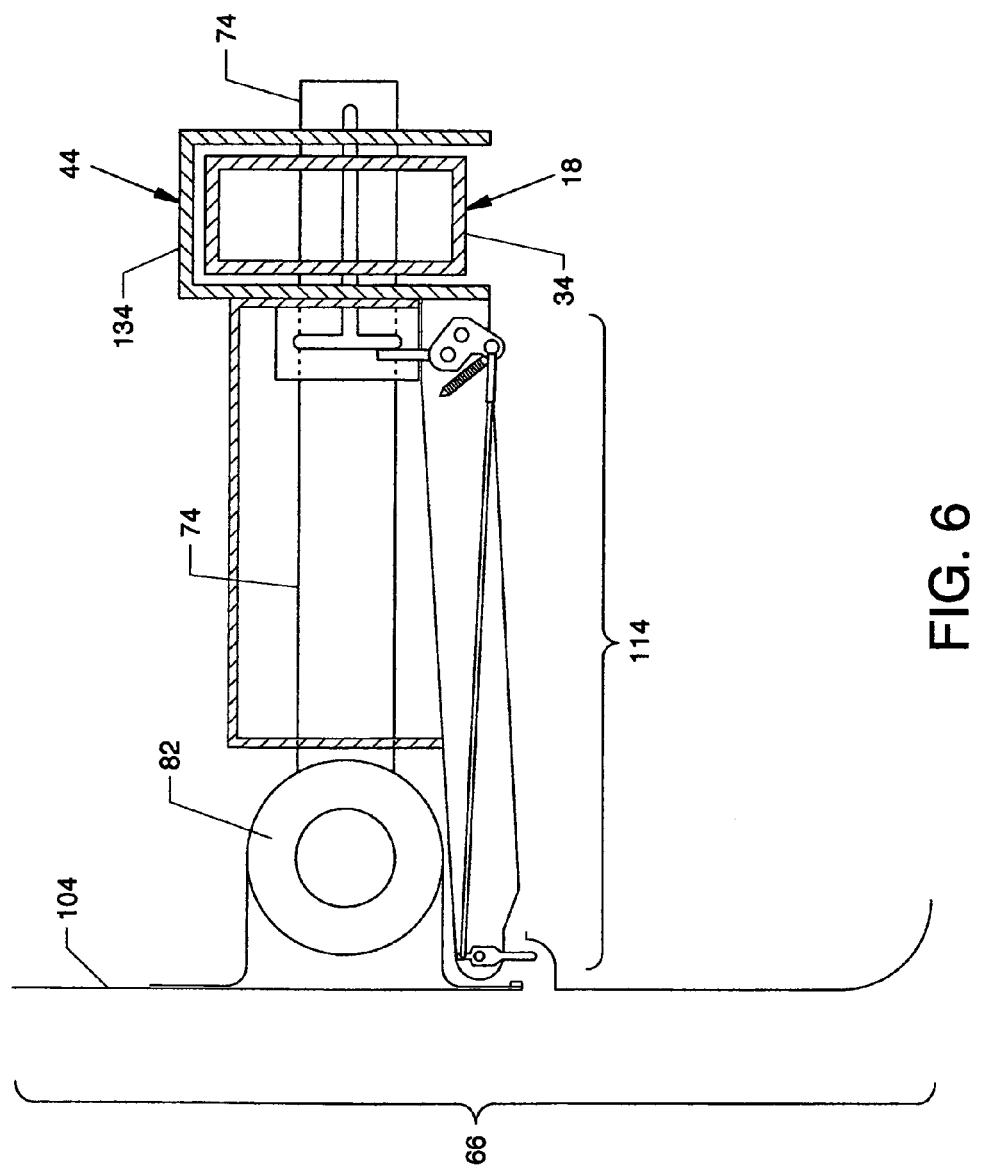
FIG. 6 schematically shows a partial cross section view as suggested by 10-10 of FIG. 2 of stowed sliding lock jack assembly, with the locking tube extending through mounting holes or apertures in a locked position, thereby locking the specialized frame of the base vehicle, rearward of the driving cab, to the frame channels on the rear module body.
Figure 7:
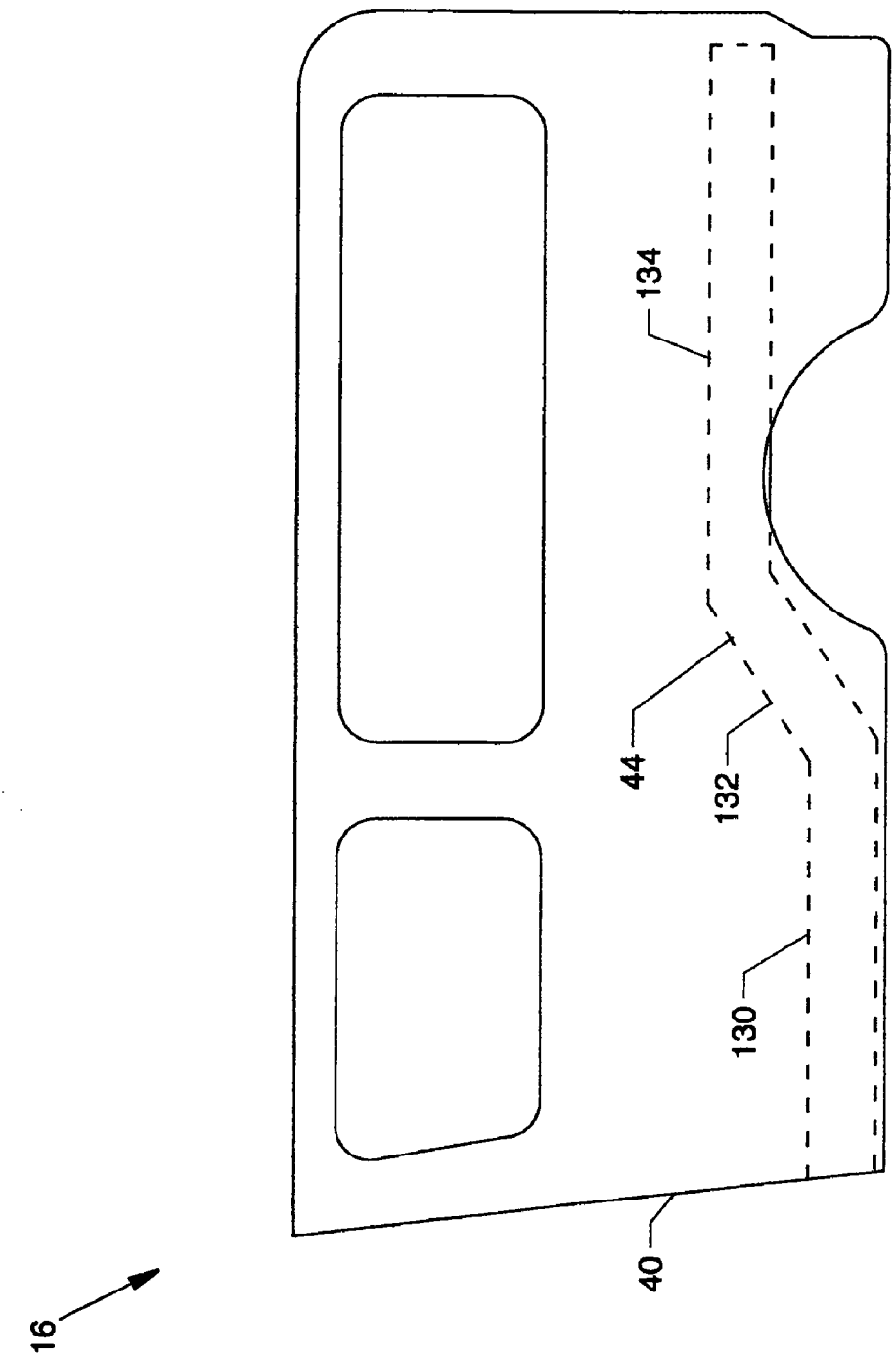
FIG. 7 schematically shows a side view of rear module body of FIG. 2 and showing frame channel and front sloping angle in outline.
Figure 8:
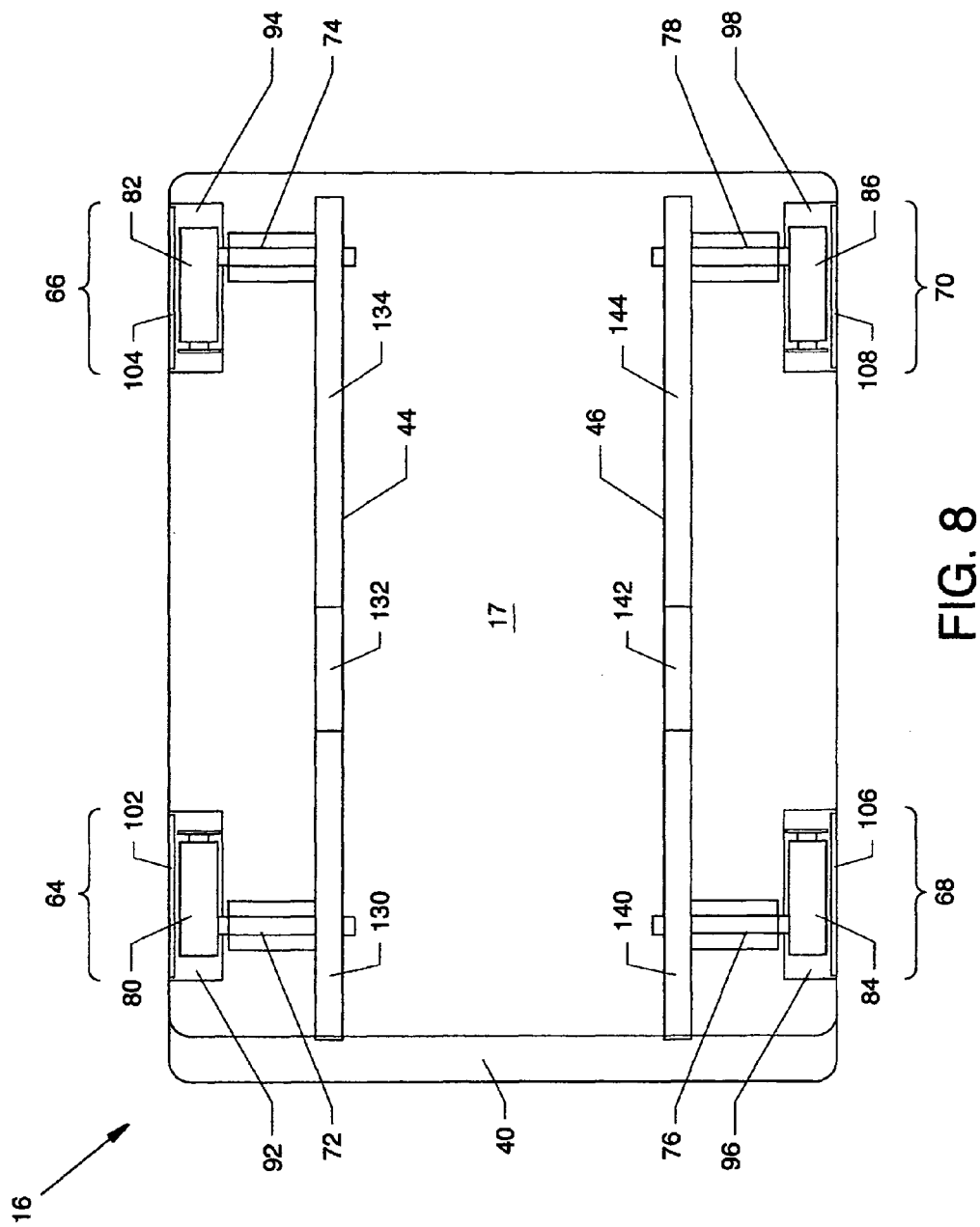
FIG. 8 schematically shows a bottom view of rear module body of FIG. 2 and showing frame channels and sliding lock jacks in stowed position.
Figure 10:
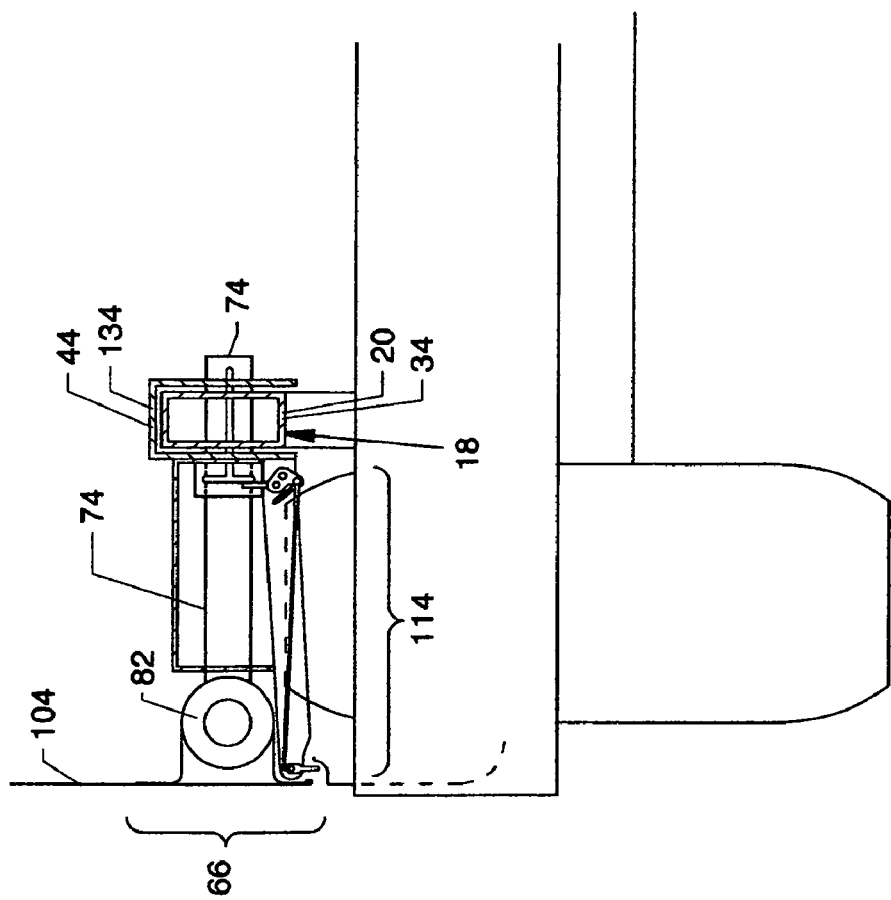
FIG. 10 shows a cross section view at 10-10 of FIG. 2 of sliding lock jacks, locking the rear module body to the specialized frame of the base vehicle rearward of the driving cab, as well as showing the manual locking lever.
Figure 11:
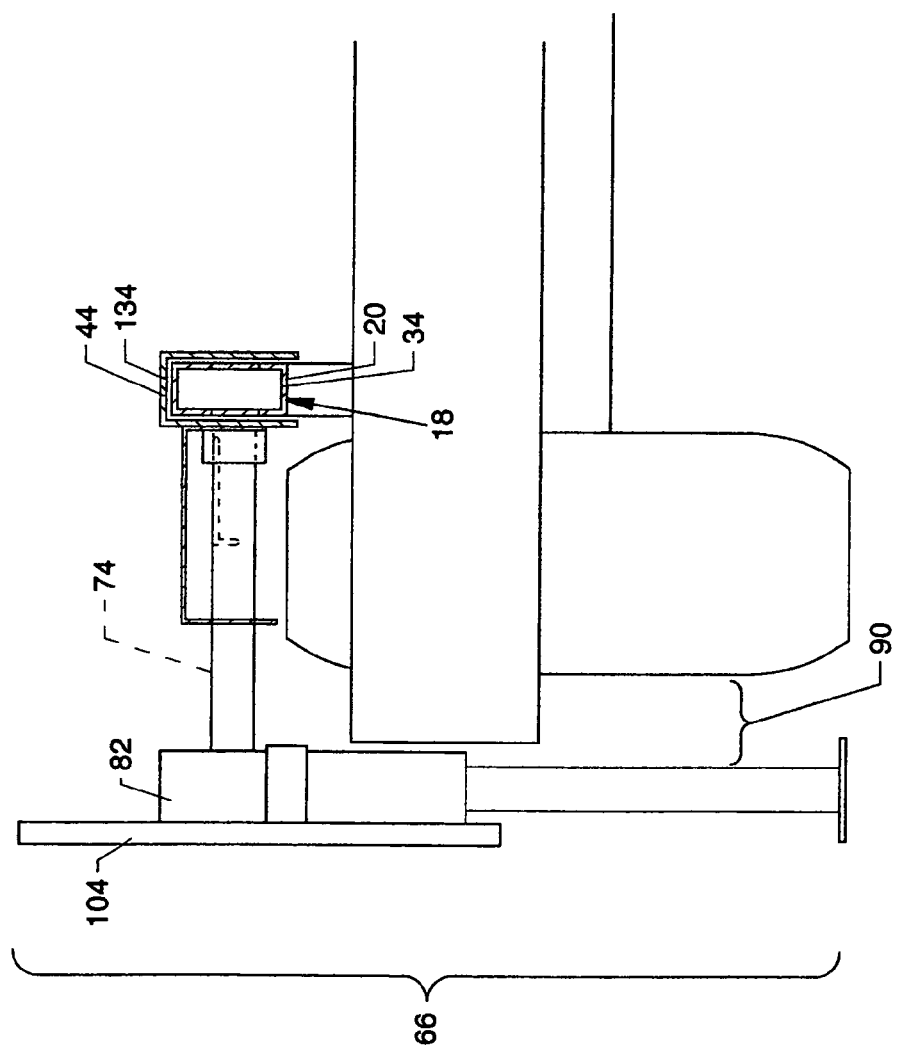
FIG. 11 shows a cross section view at 11-11 of FIG. 3 of sliding lock jack deployed and also showing frame channels on the specialized frame of the base vehicle rearward of the driving cab.

The rear module bodies 16 will be fitted with four sliding lock jack assemblies 64, 66, 68, 70, as shown in FIG. 5. The four sliding lock jacks 64, 66, 68, 70 each include locking tubes 72, 74, 76, 78, respectively. These locking tubes, for example, left rear locking tube 74 of left rear sliding locking jack assembly 66 are shown in a locked position in FIG. 10 in which the locking tube 74 goes completely thru the outside left rear aperture 56 and the inside left rear aperture of the elevated left rear segment 34 of the left frame rail 20 behind driving cab 14, engaging and locking the specialized frame 18 and also completely through the rear module body frame channel 44. The unlocked position, schematically depicted in FIG. 11, shows the locking tube 74 completely disengaged from the specialized frame 18 extending rearward from the driving cab 14. These locking tubes 72, 74, 76, and 78 are attached to the jacks 80, 82, 84, and 86, as schematically depicted in FIG. 11. Each locking tube 72, 74, 76, and 78 on the sliding lock jack assemblies 64, 66, 68, and 70 will serve four purposes. First is the locking of the rear module body 16 to the specialized frame 18 as depicted schematically in FIG. 6 which is showing the locking tubes 80, 82, 84, and 86 extending thru both the frame channels 44 and 46 on the rear module body 16 and the specialized frame 18. Shown in FIG. 6 is the frame channel 44 and 66 in the rear module body 16 and the specialized frame 18 rearward of the driving cab 14. Second, is to allow a 90 degree rotation of the jack 80, 82, 84, and 86 from the horizontally stowed position shown in FIG. 2, to the vertically deployed position shown in FIG. 3 which would allow the jacks 80, 82, 84, and 86 to lift the rear module bodies 16 from the specialized frame 18. Third, is to create a clearance 90, as shown in FIG. 11, from the rear wheels. The fourth purpose would allow supporting of weight of the rear module body 16 when detached from the specialized frame 18. This would allow for free standing of the rear module body 16 as schematically depicted in FIG. 4. After the rear module body 16 is detached from the specialized frame 18 behind the driving cab 14, the base vehicle 12, including the driving cab 14 can be driven away to another free standing rear module body 16.

When attaching the rear module bodies 16 to the driving cab 14 with specialized frame 18, the frame channels 44 and 46 on the rear module body 16 and the specialized frame 18 on the driving cab 14 will first be aligned. Then second when lowering rear module bodies 16 onto the specialized frame 18, the slope segment 24 of the left rail 20 and the slope segment of the right rail of the specialized frame 18 in front of the rear axle 28 will create a forward push on the rear module body 16 towards the driving cab 14, allowing for a tight fit between the rear module body 16 and the driving cab 14 at junction 42. The rear 38 of the driving cab 14 will have a slight angle "A" going forward from bottom to top as depicted in FIG. 1 this angle "A" will match the angle "B" on the front 40 of the rear module body 16. This would ease friction between the weather-stripping while engaging and disengaging the rear module bodies from the drive cab 14.

The rear module bodies 16 will have four compartments 92, 94, 96, and 98 which will each house one of the sliding lock jack assemblies 64, 66, 68 and 70. The sliding lock jack assemblies 64, 66, 68, and 70 will each have body panels 102, 104, 106, and 108 attached on the outside as depicted in FIG. 3. Which body panels 102, 104, 106, and 108 when closed as schematically depicted in FIG. 2 will conceal the compartments 92, 94, 96, and 98 and remainder of the sliding lock jack assemblies 64, 66, 68, and 70. On the insides of the compartments 92, 94, 96, and 98 there will be manual lever mechanisms, such as manual locking mechanism 114, as schematically depicted in FIG. 6, that locks and unlocks the locking tubes 72, 74, 76, 78 of the sliding lock jack assemblies 64, 66, 68, and 70.

This invention includes a base vehicle 12 with a driving cab 14 and with a specialized frame 18 together forming part of a system that would allow fast and easy removal of rear module bodies 16 configured to fit thereon. There would be no tools necessary for removal or attachment of rear module bodies 16. The invention is simple enough for a person with little mechanical knowledge to use the sliding lock jack assemblies 64, 66, 68, and 70. He/She can transform the quick changing rear module body vehicle 10 from one type to another, ie: regular cab pickup truck, extended cab pickup, crew cab pickup, flat bed truck, suv, van, crossover, camper, ect. in just minutes.

The present invention, in a preferred embodiment, is an interchangeable rear modular body vehicle 10. This invention would have a base vehicle 12 including a driving cab 14 and also including everything needed to drive the base vehicle 12, at least an engine, at least four wheels and a gas tank. The rear 38 of the driving cab 14 behind the driver and passenger doors 15 would be open to the back allowing many different rear body configurations or variations of the rear module bodies 16 to be attached to the specialized frame 18 behind the driving cab 14. This invention with the specialized frame 18 and various designs for rear module bodies 16 would allow for fast and easy attachment and removal of rear modular bodies 16. This embodiment preferably includes four sliding lock jack assemblies 64, 66, 68, and 70 which will be attached to the rear module bodies 16 that will allow these rear module bodies 16 to be removed and or attached to the specialized frame 18. Jacks 80, 82, 84, and 86, which are part of the sliding lock jack assemblies 64, 66, 68, and 70 will manually deploy from compartments 92, 94, 96, and 98 in the rear module bodies 16 by pulling out and disconnecting the rear module body 16 from the specialized frame 18 then rotating 90 degrees allowing jacks 80, 82, 84, and 86 to lift the rear module body 16 off of the specialized frame 18. In a preferred embodiment, jacks 80, 82, 84, and 86 will be electrically powered with a control switch located in one of the compartments 92, 94, 96, and 98. Once the rear body module 16 and the specialized frame 18 are separated the electrical power will need to be disconnected using a quick disconnect feature.

After the electrical power is disconnected, the driving cab 14 is used to drive the base vehicle 12 to another rear module body 16. To reattach another rear module body 16, position the base vehicle 12 under the another rear module body 16 aligning the specialized frame 18 with the frame channels 44 and 46. Connect electric power and retract jacks 80, 82, 84, and 86 which will lower the rear module body 16 onto the specialized frame 18. Once jacks 80, 82, 84, and 86 are fully retracted, the rear module body 16 will need to be locked to the specialized frame 18 rearward of the driving cab 14 by manually rotating jacks 80, 82, 84, 86 by 90 degrees to place them in a horizontal condition for stowing, and suitable for movement into their respective compartments 92, 94, 96, and 98 and by pushing jacks 80, 82, 84, and 86 back into stored position which also locks the rear module body 16 to the specialized frame 18.

The present invention has been described in connection with certain embodiments. It is to be understood, however, that the description given herein has been given for the purpose of explaining and illustrating the invention and are not intended to limit the scope of the invention. It is to be further understood that changes and modifications to the descriptions given herein will occur to those skilled in the art. Therefore, the scope of the invention should be limited only by the scope of the following claims and their legal equivalents.

The invention claimed is:

1. A quick changing rear module body vehicle, comprising:
   a base vehicle, the base vehicle including a driving cab and a specialized frame extending rearward from the driving cab, the specialized frame having a slope segment;
   a rear module body, the rear module body having a bottom and a frame channel located on the bottom of the of the rear module body, the frame channel having U-shape oriented with an open bottom and contoured to fit the slope segment of the specialized frame;
   wherein, when the rear module body is vertically lowered onto the specialized frame of the base vehicle, the slope segment of the specialized frame creates a forward push of the rear module body toward the driving cab, resulting in a tight fit between the driving cab and the rear module body.

2. The quick changing rear module body vehicle of claim 1, wherein the rear body module has a front, the front of the rear module body having a forward angle;
   wherein the driving cab has a rear, the rear of the driving cab having a forward angle, the forward incline angle of the front of the rear module body matching the forward angle of the rear of the driving cab; and,
   wherein the rear body module disengages from the tight fit between the driving cab and the rear module body by lifting vertically from the tight fit between the driving cab and the rear module body.

3. The quick changing rear module body vehicle of claim 2, wherein the vertical lowering onto the frame and the vertical lifting from the tight fit between the rear module body and the driving cab are separated forward to rearward by the forward push created by the slope segment of the specialized frame when the rear module body is lowered onto the specialized frame.

4. The quick changing rear module body vehicle of claim 1, wherein the specialized frame has an aperture and the frame channel of the rear module has an aperture, which apertures align when the rear module body is tight fit to the driving cab by the forward push created by the slope segment of the specialized frame, and wherein a locking tube extending through the aligned apertures locks the rear module body to the base vehicle with the rear module body tight fit to the driving cab.

5. The quick changing rear module body of claim 4 and wherein the locking tube is a sliding locking tube, which sliding locking tube extends through the aligned apertures in a locked position to lock the rear module body to the base vehicle with the rear module body tight fit to the driving cab and slides from the apertures to an unlocked position so as to allow the rear module body to disengage for vertical lifting from the tight fit of the rear module body to the driving cab.

6. The quick changing rear module body vehicle of claim 1, further comprising a plurality of jacks, carried by the rear module body, to vertically lower the rear module body onto the specialized frame, such that the slope segment of the specialized frame creates the forward push of the rear module body toward the driving cab, resulting in a tight fit between the driving cab and the rear module body.

7. The quick changing rear module body vehicle of claim 6, wherein the plurality of jacks to vertically lower the rear module body onto the specialized frame, such that the slope segment of the specialized frame creates the forward push of the rear module body toward the driving cab resulting in the tight fit between the driving cab and the rear module body, also vertically lift the rear body module to disengage from the tight fit between the driving cab and the rear module body by lifting vertically from the tight fit between the driving cab and the rear module body.

8. The quick changing rear module body vehicle of claim 5 and wherein the sliding lock tube further includes a jack, which jack is one of a plurality of jacks to vertically lower the rear module body onto the specialized frame, such that the slope segment of the specialized frame creates the forward push of the rear module body toward the driving cab resulting in the tight fit between the driving cab and the rear module body and also to vertically lift the rear body module to disengage from the tight fit between the driving cab and the rear module body by lifting vertically from the tight fit between the driving cab and the rear module body.

9. The quick changing rear module body vehicle of claim 1 wherein the specialized frame includes two spaced apart rectangular tubular rails, each rail of the specialized frame having a slope segment, and a first and second aperture and wherein the bottom of the rear module body has two frame channels, each of the frame channels having a U-shape oriented with an open bottom and contoured to fit the slope segment of a rail of the specialized frame and a first and a second aperture, which first and second apertures of the rails align with the first and second apertures of the frame channels when the rear module body is tight fit to the driving cab, further comprising four sliding lock jack assemblies, each sliding lock jack assembly having a locking tube and a jack attached to the locking tube, the locking tube slideable between a locking position, wherein each of the locking tubes extends through one of the apertures of the rear modules body aligned therewith on the frame channels of the rear module body, and when the rear module body is tight fit to the driving cab, the locking tube further extends through an aligned aperture of the rails of the specialized frame, and an unlocked position, wherein the locking tube is unlocked from the aligned aperture of rail of the specialized frame, such that the rear module body may be lifted vertically from the tight fit with the driving cab.

10. The quick changing rear module body vehicle of claim 9 wherein the locking tubes of the sliding lock jack assembly rotate 90 degrees, such that the jacks sliding locking assemblies rotate between a vertical lifting orientation of the jacks and a horizon stowing orientation of the jacks, and further comprising: horizontally oriented side compartments for housing jacks in the horizontal stowing orientation when the locking tubes are in the locked position.

11. The quick changing rear module body vehicle of claim 10 wherein each sliding lock jack assembly further carries a body panel for concealing the jack and sliding tube of the sliding lock jack assembly within the stowing compartments in the horizontal stowing orientation, the body panels attached to the jacks.

12. The quick changing rear module body vehicle of claim 1 wherein the rear module body is one of a plurality of rear module bodies, each of the rear module bodies of the plurality having a frame channel located on the bottom of the of the rear module body, the frame channel having U-shape oriented with an open bottom and contoured to fit the slope segment of the specialized frame such that when each rear module body is vertically lowered onto the specialized frame of the base vehicle, the slope segment of the specialized frame creates a forward push of each rear module body toward the driving cab, resulting in a tight fit between the driving cab and the rear module body.

13. The quick changing rear module body of claim 12 and wherein the rear module bodies of the plurality of rear module bodies have configurations selected from group consisting of: regular cab pickup truck, extended cab pickup, crew cab pickup, flat bed truck, suv, van, crossover, and camper.

14. The quick changing rear module body vehicle of claim 1 wherein the driving cab has a back, the back of the driving cab is open, and the rear module body has a front, the front of the rear module body is open, and wherein, when the open front of the rear module body is tight fit to the open rear of the driving cab, a van or suv results.

15. A method of assembly for a vehicle, the method comprising the steps of:

providing a base vehicle having a driving cab and a specialized frame having two rectangular tubular rails, each with a slope segment;

providing a rear module body with a bottom having two frame channels, the frame channels having a U-shape with an open bottom and contoured to fit the slope segments of the rails of the specialized frame;

aligning the frame channels over the rails of the specialized frame;

lowering the rear module body onto the specialized frame; and, creating a forward push by the slope segments interacting with the contoured frame channels, such that a tight fit results between the rear module body and the driving cab.

16. The method of claim 15 and further comprising the step of:

fastening the frame channels to the rails after the rear module body is tight fit to the driving cab.

17. The method of claim 15 and further comprising the steps of:

lifting the rear body module vertically from the tight fit with the driving cab;

providing another rear module body with a bottom having two frame channels, the frame channels having a U-shape with an open bottom and contoured to fit the slope segments of the rails of the specialized frame;

aligning the frame channels of the another rear module body over the rails of the specialized frame;

lowering the another rear module body onto the specialized frame; and, creating a forward push by the slope segments interacting with the contoured frame channels of the another rear module body, such that a tight fit results between the another rear module body and the driving cab.

* * * * *